United States Patent US 12,123,890 B2
Mahalingam et al.
Date of Patent: Oct. 22, 2024

(54) ADJUSTABLE CONE METER WITH SYMMETRICAL SLEEVE

(71) Applicants: GM Flow Measurement Services Ltd., Aberdeenshire (GB); SAUDI ARABIAN OIL COMPANY, Dhahran (SA)

(72) Inventors: Sakethraman Mahalingam, Aberdeen (GB); Gavin Munro, Peterhead (GB); Victor Gawski, Peterhead (GB)

(73) Assignees: SAUDI ARABIAN OIL COMPANY, Dhahran (SA); GM Flow Measurement Services Ltd., Aberdeenshire (GB)

( * ) Notice: Subject to any disclaimer, the term of this patent is extended or adjusted under 35 U.S.C. 154(b) by 0 days.

(21) Appl. No.: 18/345,481

(22) Filed: Jun. 30, 2023

(65) Prior Publication Data

US 2023/0341308 A1    Oct. 26, 2023

Related U.S. Application Data

(62) Division of application No. 17/654,364, filed on Mar. 10, 2022, now Pat. No. 11,761,868.

(51) Int. Cl.
 *G01N 9/26* (2006.01)
 *G01F 1/40* (2006.01)

(52) U.S. Cl.
 CPC ............... *G01N 9/26* (2013.01); *G01F 1/40* (2013.01)

(58) Field of Classification Search
 None
 See application file for complete search history.

(56) References Cited

U.S. PATENT DOCUMENTS

| | | | | | |
|---|---|---|---|---|---|
| 4,538,470 | A | * | 9/1985 | Snell | G01F 1/42 |
| | | | | | 73/861.61 |
| 7,367,241 | B2 | * | 5/2008 | Ohmi | G05D 7/0635 |
| | | | | | 73/861.52 |
| 8,683,875 | B2 | * | 4/2014 | Lawrence | G01F 1/36 |
| | | | | | 73/861.65 |
| 2018/0128661 | A1 | * | 5/2018 | Munro | G01F 1/34 |

* cited by examiner

*Primary Examiner* — Justin N Olamit
(74) *Attorney, Agent, or Firm* — Osha Bergman Watanabe & Burton LLP

(57) ABSTRACT

A method for determining flow rates and phase fractions within a throughbore is disclosed. The method includes providing a mixture of one or more fluids through a fluid flow path in a throughbore at a flow rate, reducing the flow rate, slidably moving a first and second sleeve along the throughbore to a first position of a plurality of positions, measuring a first and second differential pressure at the first position, calculating a first loss pressure ratio from the first and second differential pressure. The method further includes slidably moving the first sleeve and second sleeve to each of the others of the plurality of positions in succession after the first position, measuring a plurality of differential pressures and calculating a loss pressure ratio at each of the plurality of positions, and calculating a plurality of flow rates phase fractions of the fluids flowing through the fluid flow path.

5 Claims, 8 Drawing Sheets

ADJUSTABLE CONE METER WITH SYMMETRICAL SLEEVE

CROSS-REFERENCE TO RELATED APPLICATIONS

This Application is a Division of application Ser. No. 17/654,364 filed on Mar. 10, 2022. The entire contents of these applications are incorporated herein by reference in their entirety.

BACKGROUND

In the oil and gas industry, accurately monitoring fluid flow in production lines is of upmost importance. In practice, fluid flow meter devices may be disposed within production lines to continuously monitor fluid flow rate. In particular, a differential pressure flow meter is one type of fluid flow meter which operates based upon the Bernoulli principle, which teaches that an increase in speed of a fluid occurs concurrently with a decrease in fluid pressure. Differential pressure flow meters, such as V-cone meters, measure the differential pressure caused in a fluid as the fluid is forced to flow around an obstacle, like a cone disposed within a pipe, or through a constriction, which allows for the calculation of fluid flow rate.

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method, which includes providing a mixture of one or more fluids through a fluid flow path in a throughbore at a flow rate, reducing the flow rate of the one or more fluids, and slidably moving a first sleeve and a second sleeve along the throughbore to a first position of a plurality of positions. The method further includes measuring a first differential pressure and a second differential pressure at the first position of the plurality of positions, calculating a first loss pressure ratio from the first differential pressure and the second differential pressure, and slidably moving the first sleeve and the second sleeve to each of the others of the plurality of positions in succession after the first position. The method also includes measuring a plurality of differential pressures at each of the plurality of positions, calculating a loss pressure ratio at each of the plurality of positions, and calculating a plurality of flow rates and a plurality of phase fractions of the one or more fluids flowing through the fluid flow path from the measured differential pressures and the calculated loss pressure ratios.

In another aspect, embodiments disclosed herein relate to a fluid displacement apparatus, which includes a fluid displacement member disposed in a center of a throughbore, a first sleeve disposed in the throughbore upstream of the fluid displacement member, and a second sleeve disposed in the throughbore downstream of the fluid displacement member.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
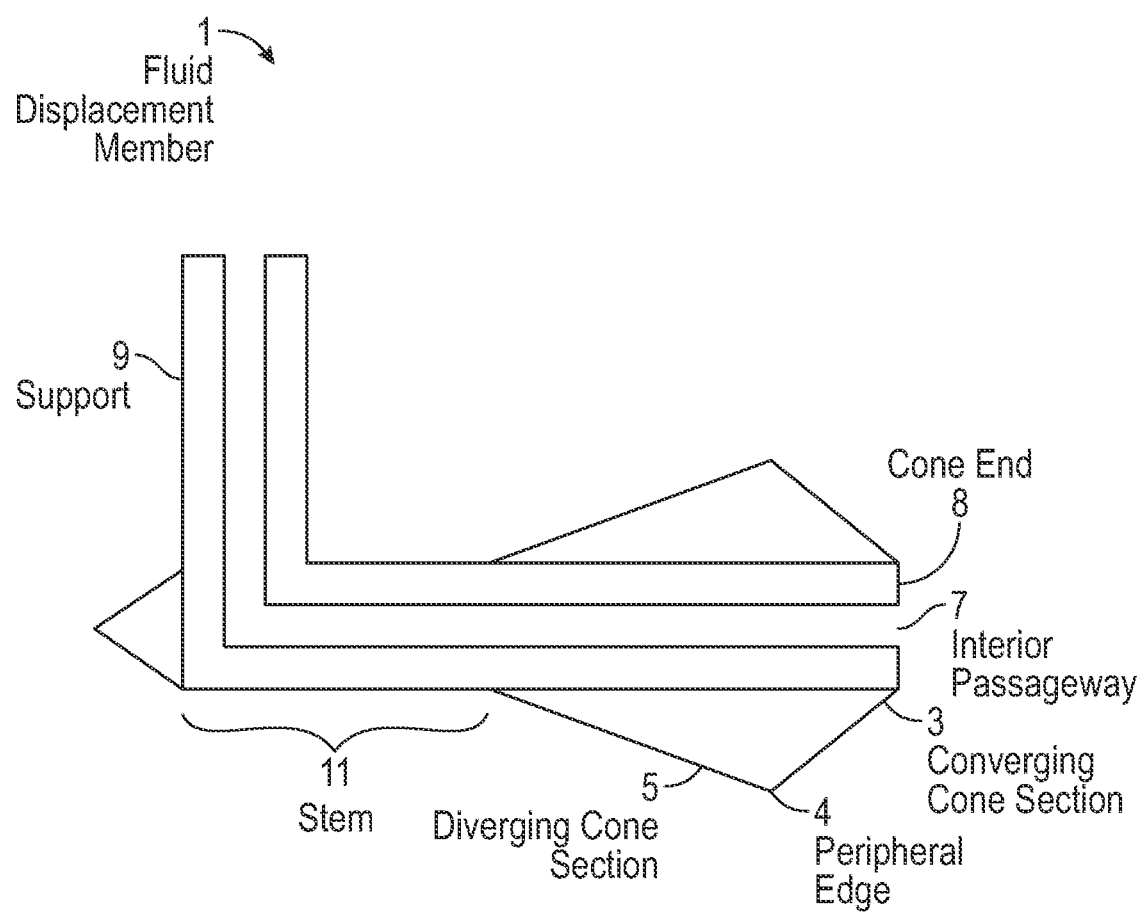
FIG. 1 shows a fluid displacement member in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Disclosed herein are embodiments of apparatuses and methods for measuring the flow rate and density of fluids produced from an oil and gas well. In particular, disclosed herein are embodiments of apparatuses and methods for implementing a flow displacement apparatus which may fully encapsulate a fluid displacement member with a cylindrical sleeve. More specifically, embodiments disclosed herein relate to fully encapsulating a fluid displacement member, which may be a cone meter, through the use of multiple slidable sleeves or through the use of a single sleeve in conjunction with a modified cone meter such that flow rates and density of fluids flowing through a pipe and around the cone meter may be calculated. In particular, fluid flow rate may be calculated using Equation 1:

$$Q_m = \frac{C}{\sqrt{1-\beta^4}} \varepsilon \frac{\pi}{4} (D\beta)^2 \sqrt{2\Delta p \rho_f},$$ Equation 1 where $Q_m$ is the mass flow rate of the fluid, C is the coefficient of discharge, $\beta$ is the beta ratio, $\varepsilon$ is the expansibility of the fluid, D is the inner pipe diameter, $\Delta p$ is differential pressure, and $\rho_f$ is the density of the fluid at the pressure and temperature at the cone.

FIG. 1 depicts an exemplary fluid displacement member 1, which may be colloquially referred to as a cone meter. The fluid displacement member 1 may be configured to induce a pressure difference between a fluid upstream and a fluid downstream of the fluid displacement member 1. The fluid displacement member 1 may include a converging cone section 3, a peripheral edge 4, and a diverging cone section 5 arranged in such a way that would cause a drop in fluid pressure as the fluid passes over the fluid displacement member 1. However, as one skilled in the art will be aware, there are many configurations of fluid displacement members with many different shapes that may be suitable for the same purpose. In one or more embodiments, the fluid displacement member 1 may have a hollow interior passageway 7, where an end disposed in the fluid flow path may be referred to as a cone end 8. There are other embodiments in which the fluid displacement member 1 may be a solid piece. The fluid displacement member 1 may have a support 9, which can be used to fasten the fluid displacement member to a body such that the fluid displacement member 1 may be suspended centrally within a fluid flow path. The support 9 may be connected to the converging cone section 3 and diverging cone section 5 by a stem 11.

Figure 2A:
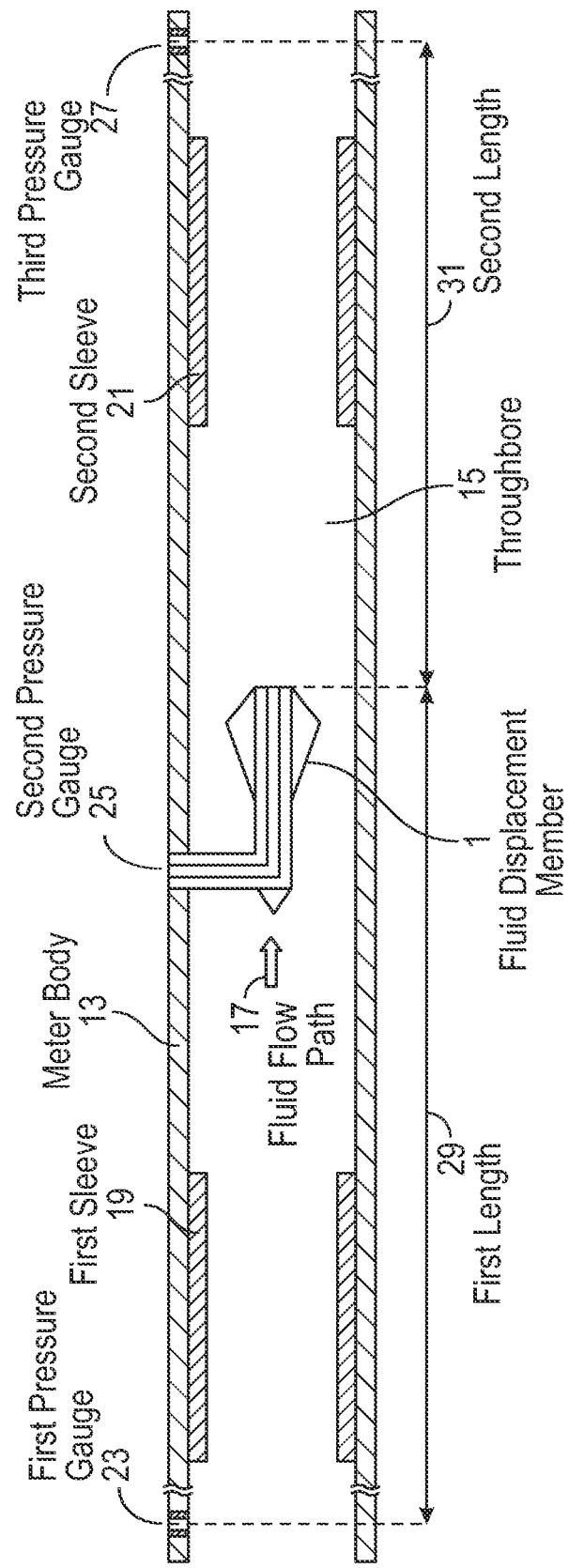
FIGS. 2A and 2B show flow displacement apparatuses in accordance with one or more embodiments.

FIG. 2A shows a flow displacement apparatus in accordance with one or more embodiments. A fluid displacement member 1 may be disposed within a meter body 13, which may have a throughbore 15. The throughbore 15 may have a fluid flow path 17 through which a fluid may flow. The fluid displacement member 1 may be suspended in the fluid flow path 17 and from the meter body 13 by a support 9, which may also reduce vibrations caused by fluid flow over the fluid displacement member 1. The meter body 13 may be coaxially connected to pipe sections (not shown), where the meter body 13 may be incorporated into production line system as a part of the oil and gas production system. The meter body 13 may be coaxially connected to pipe sections by a threadable connection, welding, or any other connection method typically utilized in the oil and gas industry.

A first sleeve 19 may be disposed in the throughbore 15 upstream of the fluid displacement member 1. A second sleeve 21 may be disposed in the throughbore 15 downstream of the fluid displacement member 1. A first pressure gauge 23 may be disposed on the meter body 13 upstream of the fluid displacement member 1 in such a way that the first pressure gauge 23 may be in fluid communication with the fluid flow path 17. Further, the first pressure gauge 23 may be disposed upstream of the first sleeve 19. A second pressure gauge 25 may be disposed on the fluid displacement member 1 and may be in fluid communication with the fluid flow path 17 through the interior passageway 7. A third pressure gauge 27 may be disposed on the meter body 13 downstream of the fluid displacement member 1 and downstream of the second sleeve 21. The third pressure gauge 27 may be in fluid communication with the fluid flow path 17. A first length 29 may refer to the axial length between the first pressure gauge 23 and the cone end 8. Similarly, a second length 31 may refer to the axial distance between the cone end 8 and the third pressure gauge 27.

Figure 2B:
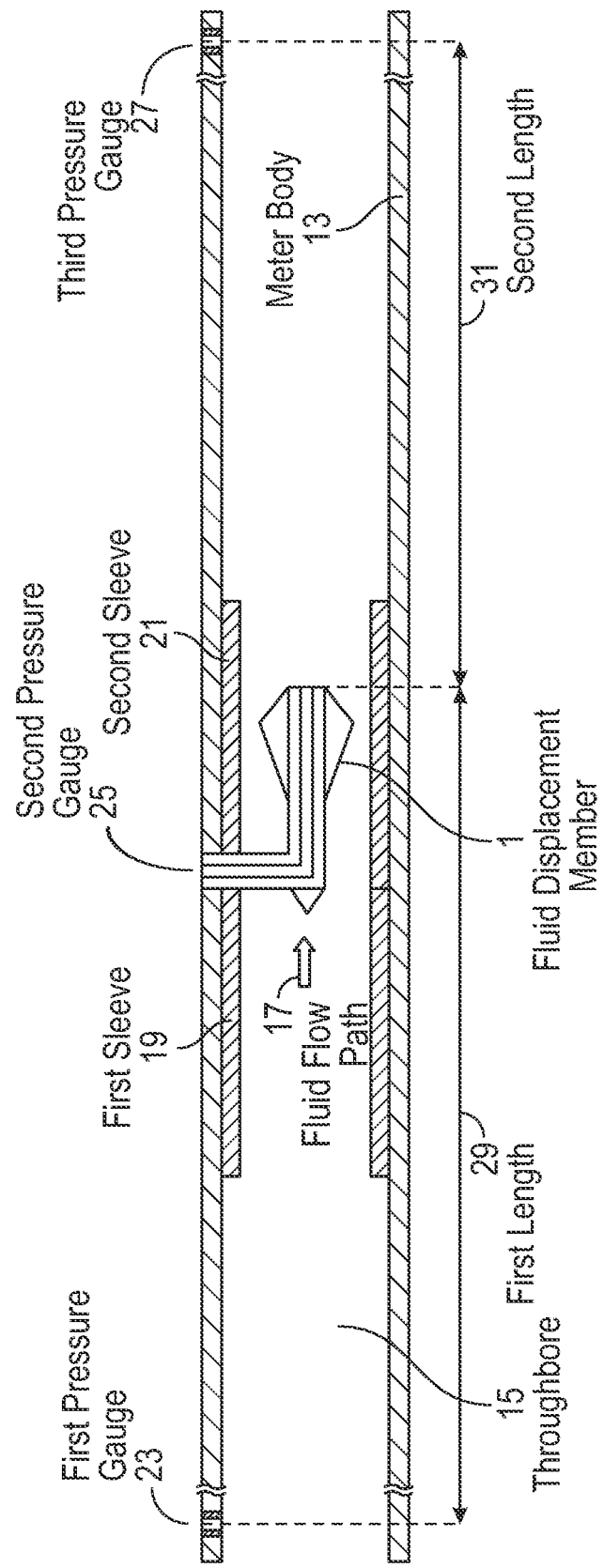

The first sleeve 19 and the second sleeve 21 may be annular in shape and may be slidable along the throughbore. As shown in FIG. 2B, the first sleeve 19 and the second sleeve 21 may be slidably moved in an axial direction through the throughbore 15 to fully encapsulate the fluid displacement member 1. The first sleeve 19 and the second sleeve 21 have an inner diameter which is smaller than the inner diameter of the throughbore 15. In one or more embodiments, the inner diameter of the first sleeve 19 is equal to the inner diameter of the second sleeve 21. In other embodiments, the inner diameter of the first sleeve 19 may be different (i.e., smaller or larger than) the inner diameter of the second sleeve 21. In one or more embodiments, the first sleeve 19 and the second sleeve 21 are positioned in their respective upstream and downstream locations, as shown in FIG. 2A, when the fluid flow rate is high. In such embodiments, as fluid flow rate is reduced, the first and second sleeves 19, 21 may slidably move towards one another, covering the fluid displacement member 1 from both the upstream and downstream directions, forming a consistent inner diameter around the fluid displacement member 1.

Figure 3A:
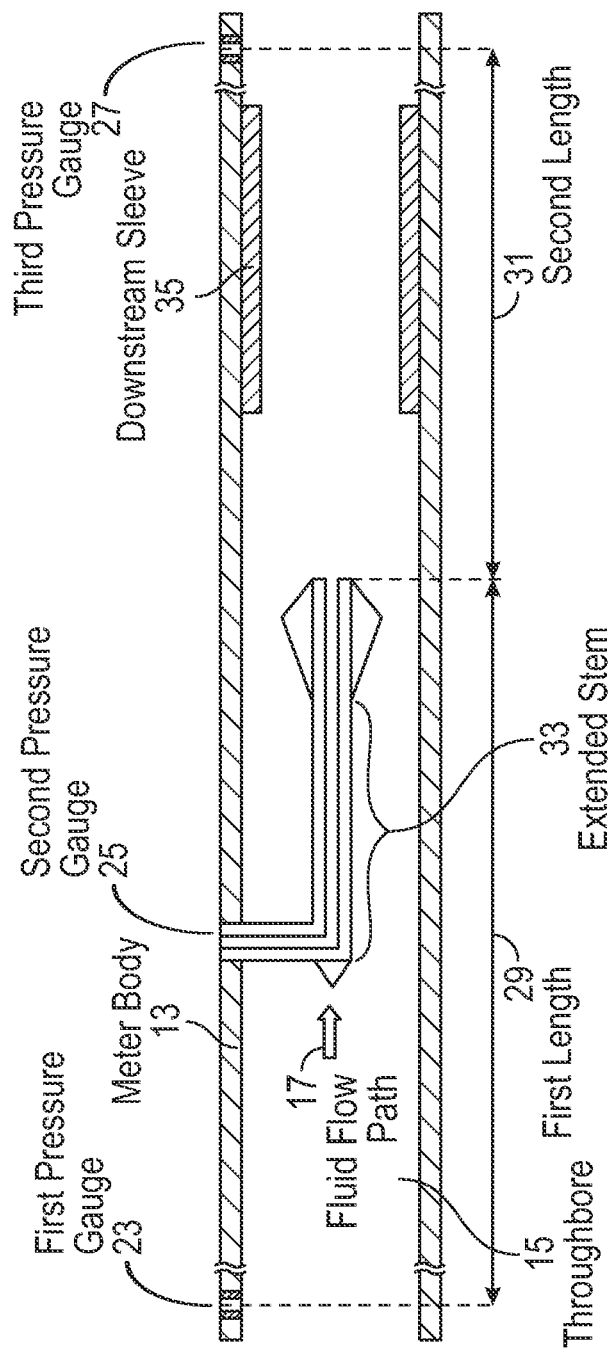
FIGS. 3A and 3B show flow displacement apparatuses in accordance with one or more embodiments.
Figure 3B:
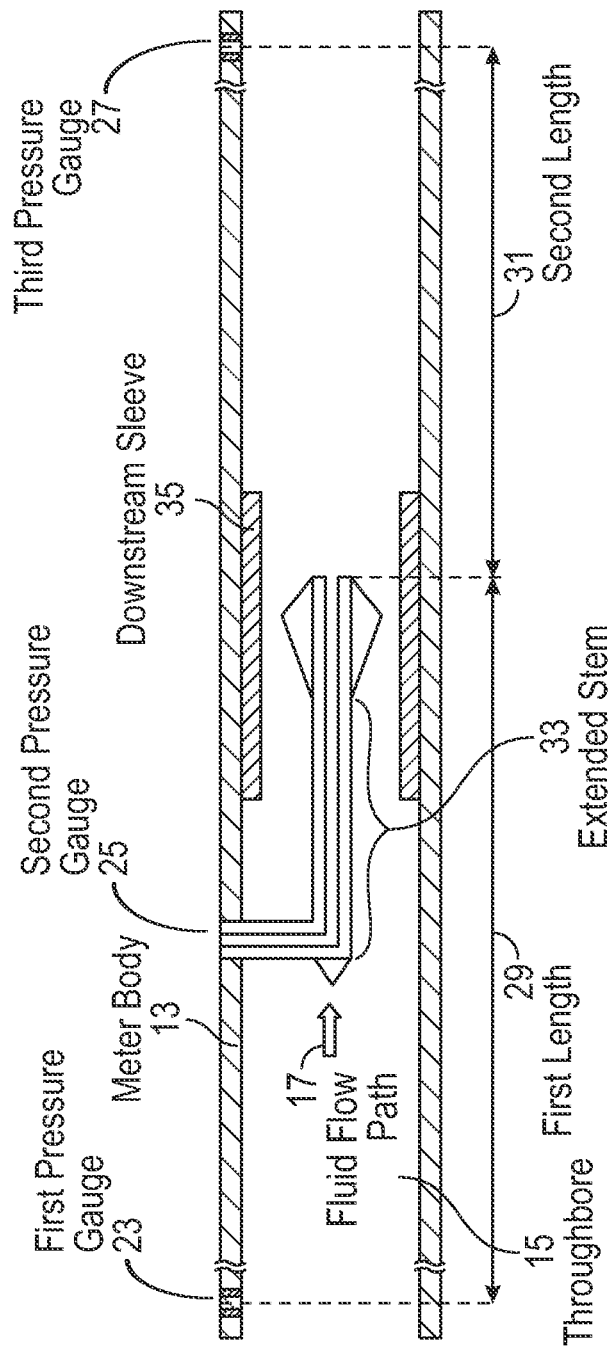

FIGS. 3A and 3B show another fluid displacement apparatus in accordance with one or more embodiments. In such embodiments, a modified fluid displacement member 1 may be disposed within the fluid flow path 17, where the fluid displacement member may have an extended stem 33. A downstream sleeve 35 may be disposed within the throughbore 15 and may be slidably moved axially along the throughbore 15. Similarly to the embodiments depicted in FIGS. 2A and 2B, the downstream sleeve 35 may slidably move through the throughbore 15 to cover the fluid displacement member 1 during instances of reduced fluid flow rate. In such instances, as depicted in FIG. 3B, the downstream sleeve 35 may create a consistent inner diameter around the converging cone sections 3 and diverging cone sections 5, as well as a section of the extended stem 33.

Depending on flow conditions, there may be instances in which embodiments with a first sleeve 19 and a second sleeve 21, as shown in FIGS. 2A and 2B, are preferable over embodiments with an extended stem 33 and a downstream sleeve 35, as shown in FIGS. 3A and 3B, and vice versa. For example, in embodiments with wet-gas flow, use of a first sleeve 19 upstream of the fluid displacement member 1 as well as a second sleeve 21 downstream of the fluid displacement member 1 may help to stabilize and develop the flow as it moves past the fluid displacement member 1. In such embodiments, the wet-gas flow may comprise less than 2% of the total fluid volume. As such, the transition of the inner diameter of the throughbore 15 to the inner diameter of the first sleeve 19, combined with the introduction of the fluid displacement member 1 to the fluid flow path 17 may cause a pressure drop and fluid instability at the fluid displacement member 1. In particular, embodiments with a first sleeve 19 and a second sleeve 21 may be preferable whenever fluid flow is at a boundary between two flow regimes. The use of a first sleeve 19 and a second sleeve 21 may separate the effect of the change of inner diameter and the disturbance caused by the fluid displacement member 1, which may allow the fluid flow path 17 to stabilize. Stabilization of the fluid flow path 17 may allow for control of flow regime change. Further, embodiments with a first sleeve 19 and a second sleeve 21 may be preferable in situations where there is a high fluid flow rate.

Alternatively, embodiments comprising an extended stem 33 and a downstream sleeve 35 may be preferable in situations where implementing a long flow meter is impractical or unavailable. In such embodiments, the fluid displacement member 1 may vibrate at a certain frequency due to the extended stem 33. This frequency may be used to measure flow velocity through the throughbore 15. The first natural vibration frequency of the fluid displacement member 1 and the extended stem 33 may be calculated using Equation 2:

$$\text{Frequency} = \frac{S_t V}{D_m},\qquad\text{Equation 2}$$

where $S_t$ is the Stouhal number, V is the fluid velocity, and $D_m$ is the length of the extended stem 33, otherwise known as the characteristic dimension. Embodiments comprising an extended stem 33 and a downstream sleeve 35 are best implemented in situations with a low fluid flow rate and a corresponding low natural vibrating frequency. In order to select between use of a first sleeve 19 and a second sleeve 21 or an extended stem 33 and a downstream sleeve 35, maximum flow velocity and first natural frequency of the fluid displacement member 1 may be calculated.

Figure 4:
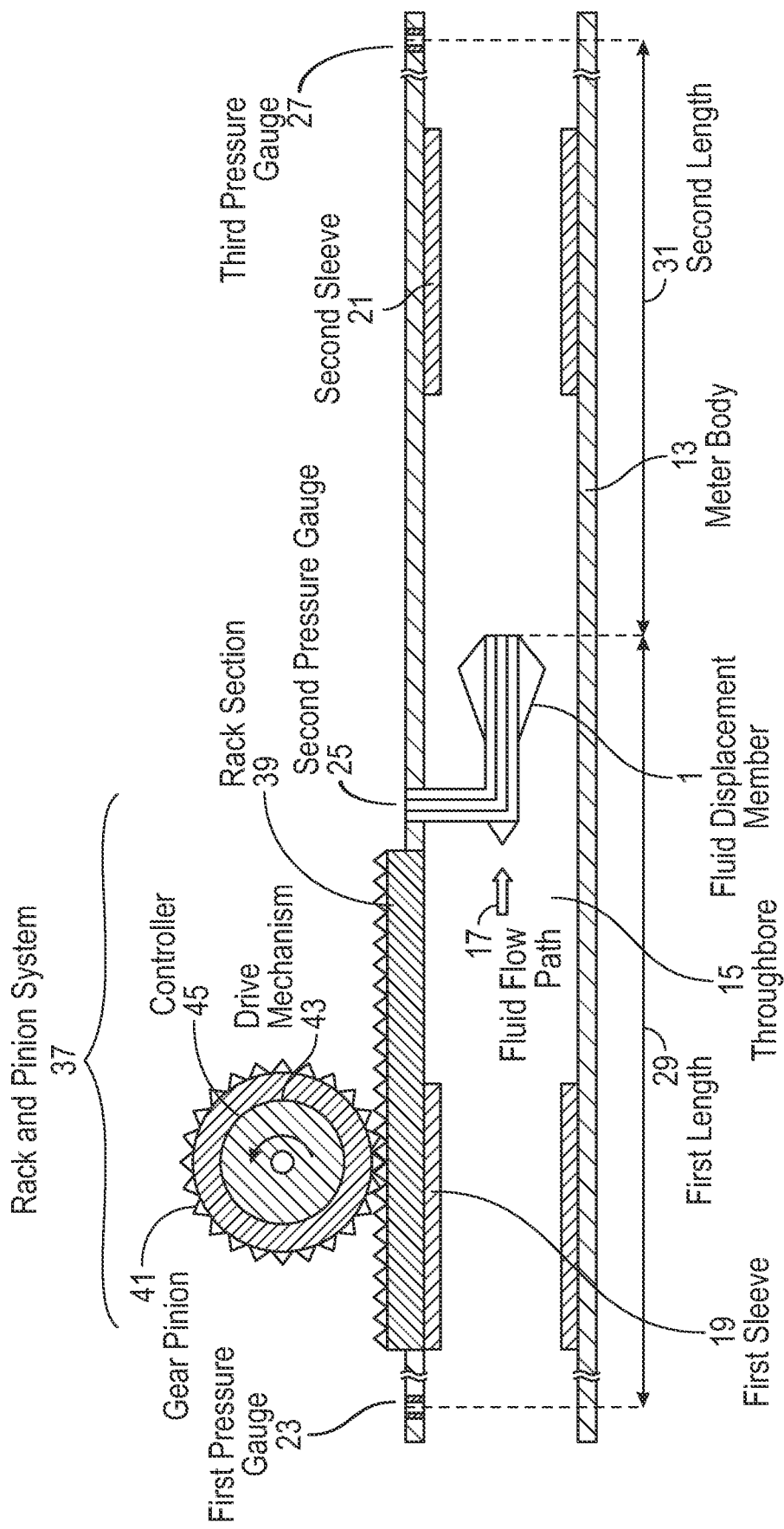
FIG. 4 shows a flow displacement apparatus in accordance with one or more embodiments.

FIG. 4 shows a fluid displacement apparatus in accordance with one or more embodiments. More specifically, FIG. 4 shows one or more embodiments of a fluid displacement apparatus where the first sleeve 19 and the second sleeve 21 are slidably moved along the throughbore 15 with a rack and pinion system 37. Though a rack and pinion system 37 may be used for both the first sleeve 19 and the second sleeve 21, the rack and pinion system 37 is only shown with respect to the first sleeve 19 for illustrative clarity and simplicity. The rack and pinion system 37 may include a rack section 39 connected to the first sleeve 19, and a gear pinion 41 which is configured to engage with the rack section 39. The gear pinion 41 may be connected to a drive mechanism 43, which may actuate the rack and pinion system 37 such that the first sleeve 19 is moved axially along the throughbore 15. As an example, the drive mechanism 43 is an electric motor and may be controlled by a controller 45. In one or more embodiments, the controller 45 may be a flow computer, which can move the first sleeve 19 automatically based on some preset logic. In other embodiments, the controller 45 may stop the first sleeve 19 at specific locations within the throughbore 15 as needed. In some embodiments, the controller 45 may allow the first sleeve 19 and the second sleeve 21 to move simultaneously. However, in other embodiments, the first sleeve 19 and second sleeve 21 may be moved separately.

Figure 5:
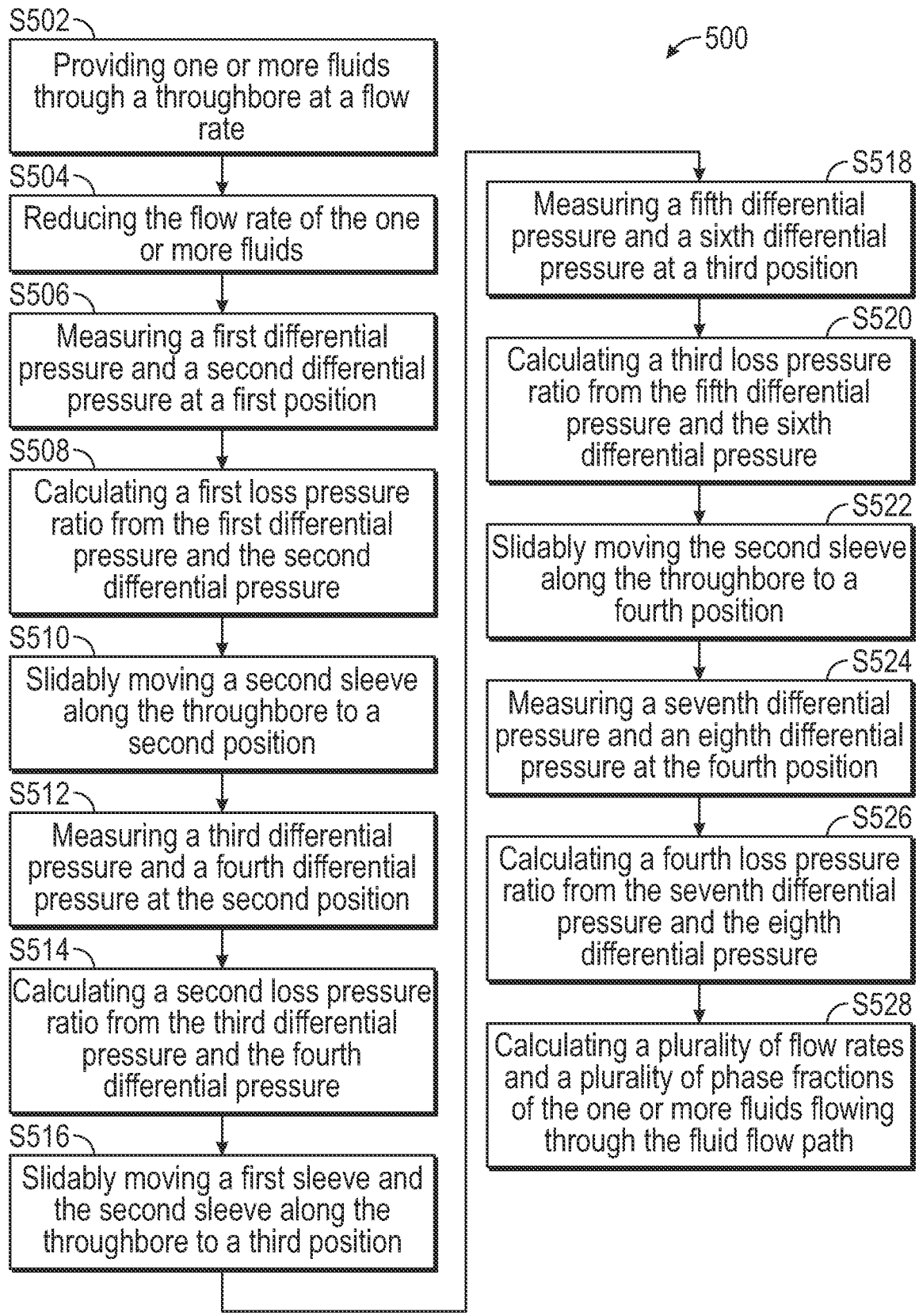
FIG. 5 shows a flowchart of a method in accordance with one or more embodiments.

FIG. 5 depicts a flowchart in accordance with one or more embodiments. More specifically, FIG. 5 depicts a flowchart 500 of a method for determining fluid flow rate and density using a flow displacement apparatus. Further, one or more blocks in FIG. 5 may be performed by one or more components as described in FIGS. 1-4. While the various blocks in FIG. 5 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, one or more fluids are provided in a fluid flow path 17 through a throughbore 15 at a flow rate, S502. When a mixture of one or more fluids is provided in the fluid flow path 17, there may be a primary phase fraction and a second phase fraction. For example, in a wet-gas flow, the primary phase is gas and the secondary phase is liquid, which, in such an example, could be a mixture of liquid hydrocarbons and water. The flow rate may be reduced, and the new flow rate may be referred to as a low flow rate, S504. A first differential pressure may be measured between the first pressure gauge 23 and the second pressure gauge 25, and a second differential pressure may be measured between the first pressure gauge 23 and the third pressure gauge 27, S506. The first differential pressure and second differential pressure may be measured at a first location, which may describe the position of the first sleeve 19 upstream of the fluid displacement member 1 and the position of the second sleeve 21 downstream of the fluid displacement member 1, S506.

A loss pressure ratio refers to the ratio between two differential pressures and may be calculated using Equation 3:

$$PLR = \frac{(P_1 - P_3)}{(P_1 - P_2)},\qquad\text{Equation 3}$$

where PLR is the pressure loss ratio, $P_1-P_3$ is the differential pressure between the first pressure gauge 23 and the third pressure gauge 27, and $P_1-P_2$ is the differential pressure between the first pressure gauge 23 and the second pressure gauge 25. $P_1-P_2$ may also be referred to as a primary differential pressure. It is well known that the pressure loss ratio is strongly correlated with the secondary phase fraction. In particular, as the secondary phase fraction increases, the pressure loss ratio may also increase. A first loss pressure ratio may be calculated from the first differential pressure and the second differential pressure using Equation 3, S508.

The second sleeve 21 may be slidably moved along the throughbore 15 to cover the fluid displacement member 1 from the downstream direction, S510. In one or more embodiments, the second sleeve 21 may be moved by a rack and pinion system 37. The position of the first sleeve 19 upstream of the fluid displacement member 1 and the position of the second sleeve 21 covering the fluid displacement member 1 may be referred to as a second position. At the second position, a third differential pressure and a fourth differential pressure may be measured, S512. The third differential pressure may refer to the differential pressure between the first pressure gauge 23 and the second pressure gauge 25 at the second position. The fourth differential pressure may refer to the differential pressure between the first pressure gauge 23 and the third pressure gauge 27 at the second position. A second loss pressure ratio may be calculated from the third and fourth differential pressure measurements using Equation 3, S514.

The first sleeve 19 and the second sleeve 21 may be slidably moved along the throughbore 15 such that the first sleeve 19 covers the fluid displacement member 1 from the upstream direction and the second sleeve 21 is located downstream of the fluid displacement member, S516. This positioning of the first and second sleeves 19, 21 may be referred to as a third position. The first sleeve 19 may have a machined slot (not pictured) located on the downstream end of the sleeve, such that the slot is complementary in shape to the support 9. As the first sleeve 19 is slidably moved along the throughbore 15, the slot may fit around the support 9 such that a consistent inner diameter is maintained around the fluid displacement member 1 in the vicinity of the support 9. A fifth differential pressure and a sixth differential pressure may be measured at the third position, S518. The fifth differential pressure may refer to the differential pressure between the first pressure gauge 23 and the second pressure gauge 25 at the third position. The sixth differential pressure may refer to the differential pressure between the first pressure gauge 23 and the third pressure gauge 27 at the third position. A third pressure loss ratio may be calculated from the fifth differential pressure and the sixth differential pressure, S520.

The second sleeve 21 may be slidably moved to join the first sleeve 19, so that the fluid displacement member is fully encapsulated, S522. This sleeve positioning may be referred to as a fourth position. A seventh differential pressure and an eighth differential pressure may be measured at the fourth position, S524. The seventh differential pressure may refer to the differential pressure between the first pressure gauge 23 and the second pressure gauge 25 at the fourth position. The eighth differential pressure may refer to the differential pressure between the first pressure gauge 23 and the third pressure gauge 27 at the fourth location. A fourth pressure loss ratio may be calculated from the seventh and eighth differential pressure measurements using Equation 3, S526.

Making differential pressure measurements at a variety of sleeve positions may allow for the calculation of fluid properties, such as density and viscosity. Though these calculations may be completed via the use of the Bernoulli principle and mass conservation principle, fluid properties may also be determined via the use of calibration curves. Calibration curves may be developed by testing a variety of fluids with different density and viscosity values. An increase in density and viscosity increases differential pressure. In embodiments where a single fluid flows through the fluid flow path 17, an estimated density may be used in Equation 1 with first differential pressure to calculate the mass flow rate of the fluid. The second differential pressure may then be used with the calculated mass flow rate to refine the initial density estimate. Additional differential pressure measurements may be used to estimate the viscosity of the fluid from calibration curves which relate density, flow rate, and viscosity to differential pressure measurements.

Taking differential pressure measurements at multiple sleeve measurements, as illustrated in flowchart 500, may help distinguish the phase fractions and flow rates of up to three different fluids combined in a mixture, where the mixture flows through the fluid flow path 17. Resolving for the flow rates and phase fractions of up to three fluids can be achieved, provided that the fluids have sufficiently distinguishable physical properties, such as density and viscosity. In such a mixture, one fluid will have a volumetric fraction of the mixture of at least 50%. In one or more embodiments, the volumetric fraction may be over 75%. For example, in a wet-gas stream which comprises natural gas, water, and oil, natural gas would occupy the dominant volumetric fraction, with water and oil occupying less than 15% of the total volume each.

Equation 1 may be written for each sleeve position, making the assumption that the mixture is entirely comprised of the dominant fluid. As such, the density of the dominant fluid will be used in Equation 1. Each sleeve position will have a different beta ratio β. A beta ratio may be characterized as the ratio of the diameter of the peripheral edge 4 of the fluid displacement member 1 and the inner diameter of the sleeve. Calibration curves that relate the first and second pressure loss ratios to the phase fractions of the second and third fluids may be used to determine the phase fractions of the second and third fluids. Since the phase fractions of all three fluids must combine to 1, the phase fraction of the first fluid can then be determined.

Further, the density of a mixture of three immiscible, homogenously mixed, and chemically non-interacting fluids may be calculated using Equation 4:

$$\rho_{mix} = \rho_1\phi_1 + \rho_2\phi_2 + \rho_3\phi_3, \quad \text{Equation 4}$$

where $\rho_{mix}$ is the density of the mixture, $\rho_1$, $\rho_2$, and $\rho_3$ are the density values of the first, second, and third fluids respectively, and $\phi_1$, $\phi_2$, and $\phi_3$ are the phase fractions of the first, second, and third fluids respectively. The density of the mixture may be calculated based on the determined phase fractions. The process of determining phase fractions may be iteratively repeated to achieve convergence of flow rate and phase fractions. In one or more embodiments, the mixture of fluids may be comprised of miscible and chemically interacting fluids. For example, there are some oils and natural gas which may chemically interact with one another. In such embodiments, a more complicated version of Equation 4 may be required to estimate the density of the mixture.

For example, in typical hydrocarbon flow, there may be a fluid mixture which includes a hydrocarbon, water, and a liquid hydrocarbon. The hydrocarbon may have a density in the range of 1-100 kg/m$^3$ and a viscosity between 0.01 and 0.2 milliPascal-seconds. The density of water may be between 1000 and 1200 kg/m$^3$ and the viscosity of water may be in the range of 0.4-1 milliPascal-seconds. The liquid hydrocarbon may have a density in the range of 750-950 kg/m$^3$ and a viscosity in the range of 1-25 milliPascal-seconds. From these examples, it is clear that the three fluids have distinct and distinguishable physical properties. Therefore, in embodiments of the method depicted in flowchart 500 where the fluids within the fluid flow path 17 have distinguishable physical properties, a plurality of fluid flow rates and a plurality of phase fractions with respect to the mixture of fluids may be calculated, S528.

In one or more embodiments, the first and second sleeves 19, 21 may be stopped at intermediate positions in between their original location (i.e., the first position), and their final location, (i.e., the fourth position). In other embodiments, the first and second sleeves 19, 21 may have a variety of profile shapes, as well as a range of possible sizes (i.e., a range of possible inner diameters). For example, the entrance or exit sections of the first and second sleeves 19, 21 may have an inclined, tapered, or stepped profile. In one or more embodiments, a stepped profile may refer to a single step. In other embodiments, a stepped profile may refer to multiple steps.

The method depicted in flowchart 500 may be utilized to calibrate the meter in a flow loop, such that curves between flow rates and fractions of the primary and second phases and the differential pressures may be developed for each sleeve position. Further, the first length 29 and second length 31, as shown in FIGS. 2-4, may be varied between 2D and 25D to achieve optimal calibration, where D is the inner diameter of the throughbore 15 (i.e. the inner diameter of the throughbore 15 in the absence of a sleeve). In one or more embodiments, the optimal first length 29 and second length 31 may be between 3D and 8D.

Figure 6:
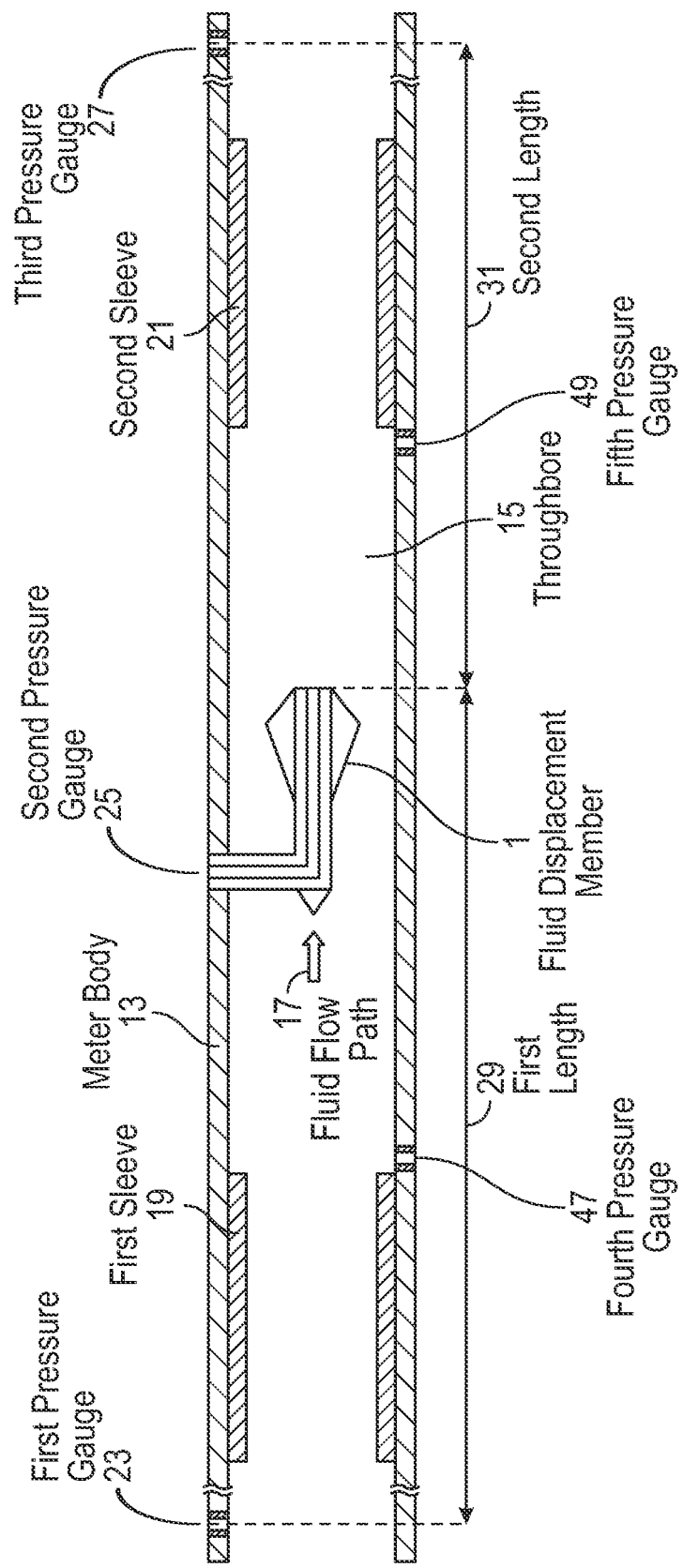
FIG. 6 shows a flow displacement apparatus in accordance with one or more embodiments.

FIG. 6 shows a flow displacement apparatus in accordance with one or more embodiments. In one or more embodiments, additional pressure sensors may be disposed along the meter body 13. For example, in some embodiments, a fourth pressure gauge 47 and a fifth pressure gauge 49 may be disposed on the meter body 13. The fourth pressure gauge 47 may be disposed directly after the first sleeve 19 in the downstream direction. Similarly, the fifth pressure gauge 49 may be disposed directly before the second sleeve 21 in the upstream direction. In high flow situations, where the first and second sleeves 19, 21 are disposed in upstream and downstream locations, such as the first position discussed in flowchart 500, the fourth and fifth pressure gauges 47, 49 may provide differential pressure measurements across the sleeves.

The fourth and fifth pressure gauges 47, 49 may be positioned such that, in low flow situations where the first and second sleeves 19, 21 both move to cover the fluid displacement member 1, the fourth and fifth pressure gauges 47, 49 may be left uncovered by the first and second sleeves 19, 21. In such embodiments, the differential pressure between the first pressure gauge 23 and the fourth pressure gauge 47 may be negligible. Similarly, in those same embodiments, the differential pressure between the third pressure gauge 27 and the fifth pressure gauge 49 may also be negligible.

Embodiments of the present disclosure may provide at least one of the following advantages. In embodiments where a single sleeve is utilized with a standard fluid displacement member in very low flow situations, an abrupt reduction in the inner diameter of the meter is created between the upstream side, where there is no sleeve, and the downstream side, where a sleeve covers the fluid displacement member. In such embodiments, this may cause significant disturbance in the fluid flow and may result in increased uncertainty in measurements. This may be particularly prevalent when the fluid flow path consists of a mixture of fluids. For example, in a fluid flow path comprising a gas flow with liquid particles, the sudden change in inner diameter may cause condensation or evaporation of the liquid within the meter, including on the sleeve and/or the fluid displacement member itself. This could increase the density of the gas-liquid mixture resulting in increased inaccuracies in differential pressure measurements. This is one example of a fluid flow path comprising a mixture of fluids, however one skilled in the art will be aware that there are many other examples with different fluid mixtures.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A fluid displacement apparatus, comprising:
   a fluid displacement member disposed in a center of a throughbore,
   wherein the fluid displacement member includes a converging cone section adjacent to a diverging cone section;
   a first sleeve disposed in the throughbore upstream of the fluid displacement member; and
   a second sleeve disposed in the throughbore downstream of the fluid displacement member,
   wherein the first sleeve and the second sleeve are slidably movable along the throughbore toward one another to radially surround the fluid displacement member.

2. The fluid displacement apparatus of claim 1, wherein the fluid displacement apparatus is disposed within a meter body.

3. The fluid displacement apparatus of claim 2, wherein the fluid displacement member is attached to the meter body by at least one support.

4. The fluid displacement apparatus of claim 1, wherein an inner diameter of the first sleeve is different to an inner diameter of the second sleeve.

5. The fluid displacement apparatus of claim 2, wherein a plurality of pressure sensors are disposed along the meter body.

* * * * *